United States Patent Office 3,684,462
Patented Aug. 15, 1972

3,684,462
PROCESS FOR PRODUCING A DIHALOBORANE-CONTAINING STREAM
Hal B. H. Cooper, 4234 Chevy Chase Drive,
Pasadena, Calif. 91103
No Drawing. Continuation-in-part of application Ser. No. 695,558, Jan. 4, 1968. This application Apr. 22, 1970, Ser. No. 31,018
Int. Cl. C01b 6/10
U.S. Cl. 423—276                    19 Claims

ABSTRACT OF THE DISCLOSURE

A process for the production of a dihaloborane-containing stream which involves mixing and reacting a boron trihalide-containing stream with a hotter stream of hydrogen, typically having a temperature in excess of 1500° C., to produce a dihaloborane-containing product stream and precipitously quenching the dihaloborane-containing stream to minimize loss of boron-hydrogen bonding.

This application is a continuation-in-part of presently pending application Serial No. 695,558, filed Jan. 4, 1968 now abandoned.

BACKGROUND OF THE INVENTION

(1) Field of the invention

This invention relates to a novel and improved method for the preparation of a dihaloborane-containing stream which is further used for the preparation of boron compounds.

The chemistry surrounding the preparation of boron-hydrogen containing compounds is complex. This invention is concerned with an economically important industrial route for the preparation of dihaloboranes, such as dichloroborane and dibromoborane, which proceeds through the hydrogenation of boron-halogen compounds at elevated temperatures.

As disclosed in the applicant's copending applications, Ser. Nos. 649,297 and 649,317, both filed June 27, 1967 now abandoned, a boron-halogen starting material such as boron trichloride may be hydrogenated at elevated temperatures to produce dichloroborane, then rapidly cooled and the dichloroborane thereafter disproportionated to produce diborane. Additionally, the dihaloborane, instead of being disproportionated to provide diborane, may also be utilized in the preparation of various organoboron compounds, for example, alkyldihaloborane, aralkyldihaloborane, bis (dihaloborane) alkanes, alicyclicdihaloboranes. Dihaloboranes decompose rapidly, for instance, it is known that the half life of pure dichloroborane at 25° F. is in the range of 8 to 12 hours. On the other hand, as reported in British Pat. No. 852,312, dihaloboranes are relatively stable in the presence of their corresponding boron trihalides. Generally speaking, a mixture of about equal mole quantities of the dihaloborane and boron trihalide, for example, 50–60 mole percent of the trihalide, is stable for practical purposes. While dihaloboranes offer great promise as starting materials in organoboron synthesis, the principal use for dihaloboranes as of this time is in the preparation of diborane, which is accomplished through disproportionation of the dihaloborane.

The preparation of dihaloborane through the reaction of hydrogen and boron trihalide is controlled by a number of conditions including pressure, temperature, catalyst, residence time, ratio of reactants, and rate of quench of the dihaloborane product stream. It is known that several reactions may occur simultaneously during the hydrogenation of the boron trihalide. For example, at higher than optimum hydrogenation temperatures and large excesses of hydrogen to the boron trihalide, elemental boron may be formed.

(2) Description of the prior art and chemistry

Typical prior art processes for the production of a dihaloborane-containing stream are disclosed in Adinoff et al. U.S. Pat. No. 3,251,643, Pearson U.S. Pat. No. 3,323,867, and Hunt et al. U.S. Pat. No. 3,328,135. In the Adinoff et al. process, boron trichloride and hydrogen are heated and reacted in a high temperature furnace to produce dichloroborane and hydrogen chloride. The Adinoff et al. process contemplates a substantially pure boron trichloride feed and this they obtain by heating and vaporizing liquid boron trichloride. In the Pearson process of U.S. Pat. No. 3,323,867 and the examples of the Hunt et al. U.S. Pat. No. 3,328,135 hydrogen and boron trihalide are heated together in a reactor to the reaction temperature required for hydrogenation of the boron trihalide in the preparation of dihaloborane, with the energy being transferred to the reactants by indirect heating through the walls of the reactor tube.

The corrosive nature of boron trichloride and other boron trihalides places a definite limitation on the temperature to which a boron trihalide-containing stream may be heated through indirect heating. Boron trichloride readily corrodes metals, even corrosion-resistant metals, such as silver, inconel and nickel, making it impractical to heat boron trichloride alone through a metal wall at a temperature much in excess of 500° C. A combined stream of boron trichloride and hydrogen may be heated to a somewhat higher temperature but even the composite stream commences to corrode the walls of metal heat exchanges around 750° C. Fused silica tubes may be employed for heating of boron trichloride and hydrogen up to a temperature of about 1000° C., above which temperature devitrification of the silica commences. While indirect heating through the walls of fused silica tubes may be accomplished for limited time periods up to about 1500° C., this can only be done at the cost of frequent tube replacement, arising from devitrification of the silica, and the economics must suffer accordingly. Fused silica has other shortcomings such as its poor conductivity. Because of these factors, the heat transfer rate of silica tubes must be low and the furnace tube area must be proportionately large, thus leading to a significant time for heating to high temperature levels and an expensive, high-cost heater system.

In the hydrogenation of boron trichloride and other boron trihalides to their corresponding dihaloboranes, higher conversions to dihaloborane are obtained with the elevation of temperature and with higher hydrogen to boron trichloride ratios. In the indirect heating of the gaseous stream through the walls of a heat exchanger, the walls of the exchanger must be hotter than the gas stream. It follows that the gas film next to the heat transfer surface is thus hotter than the bulk gas temperature. While higher temperatures give a more favorable equilibrium conversion to dihaloborane, the same elevated temperatures (above about 750° C.) promote the side reaction to produce elemental boron. In the hydrogenation of boron trichloride and other trihalides it is believed that the following reactions, as shown by Equations 1 and 2, occur in the sequence indicated with the overall reaction being represented by Equation 3:

(1) $BCl_3 + H_2 \rightleftharpoons BHCl_2 + HCl$
(2) $BHCl_2 + \frac{1}{2}H_2 \rightarrow B + 2HCl$
(3) $BCl_3 + \frac{3}{2}H_2 \rightarrow B + 3HCl$ Higher conversions to dichloroborane $BHCl_2$, Equation 1, are obtained at higher temperatures and with higher $H_2$:$BCl_3$ ratios. However, it will be seen that longer periods of time are conducive, especially at high temperatures and high $H_2$:$BCl_3$ ratios, to the formation of boron metal and the loss of boron-hydrogen bonding. Precipitous cooling is advantageous in maintaining the favorable high temperature equilibrium conversion of Equation 1 by minimizing loss of boron-hydrogen bonding due to back reaction. Any boron metal formed represents a loss in yield. It will be seen, therefore, that high ratios of $H_2$:$BCl_3$, while leading to a favorable equilibrium conversion for Equation 1, has the shortcoming of providing additional hydrogen for the progress of Equations 2 and 3 and the further disadvantage of increasing the amount of unreacted hydrogen in the exit stream from the hydrogenation step. An increase in unreacted hydrogen in the exit stream increases the amount of gas which must be circulated through the entire system, with the result that appreciably larger amounts of heat and refrigeration are required. Such excesses of unreacted hydrogen result not only in higher production costs, but also increases the size of the separation and recovery equipment and size of the heat exchange equipment, thereby materially increasing the plant capital investment.

For an industrial plant operation, it is generally speaking not practical to heat a stream of boron trichloride and hydrogen much above 750° C. because of the formation of boron solids, which will deposit on the hot heat transfer surfaces. The surfaces will necessarily be at a higher temperature than the bulk gas temperature. This, therefore, means that the higher equilibrium conversions obtainable at higher temperatures in the reaction of Equation 1 cannot be obtained in a practical sense by the methods proposed in the prior art.

SUMMARY OF THE INVENTION

The process of the invention for producing a dihaloborane-containing stream involves mixing and reacting a boron trihalide-containing stream (typically, boron trichloride or boron tribromide) with a hydrogen stream having a temperature in excess of 1500° C. and precipitously quenching the dichloro-borane-containing stream resulting from the reaction of the hydrogen and the boron trihalide to minimize loss of boron-hydrogen bonding. The high-temperature hydrogen stream serves in a dual role, both as reactant and as a source of heat for elevating the temperature of the boron trihalide and for supplying heat for the endothermic reaction of the hydrogen and boron trihalide.

The process of the invention is particularly suitable for incorporation in the systems of the aforementioned U.S. patent applications Ser. Nos. 649,297 and 649,317, for the production of dihaloborane, both of which applications are incorporated herein by reference. In the typical systems described in the two foregoing applications, the reactants supplied to the hydrogenation reaction zone are principally recycled hydrogen and recycled boron trihalide, usually boron chloride. New boron trihalide is needed in the process of the aforementioned patent applications to supply boron removed in the boron compound products of the respective processes, generally this being diborane.

It is contemplated in one embodiment of the process of the invention that at least a portion of the hydrogen will be heated, preferably in an electric arc (plasma arc), to a temperature in excess of 1500° C., usually in excess of 2000°–2500 C. In some applications it may be advantageous to heat a further portion of the hydrogen through indirect heating as in a metal heat exchanger or fused silica heater to a temperature of up to about 1200° C., usually less than 1000° C. The boron trihalide (typically recycled) may be heated part way to the reaction temperature through indirect heating in a metal heat exchanger, e.g., to a temperature up to about 500° C. It is possible to heat the boron trihalide, although at a disadvantage, to a higher temperature of about 1000° C. in a fused silica heat-exchanger. However, in the practice of the process of the invention one of the principal advantages is the supplying of heat to bring the corrosive boron trihalide to the reaction temperature through addition of a higher temperature stream of hydrogen and thus avoiding the severe problems of having to heat the boron trichloride.

The high temperature hydrogen stream is most easily heated to its elevated temperature in excess of 1500° C. by electrical means, e.g., through an electric arc. Other electrical heating means may be employed, for example, induction heating (radio frequency), or by electrical resistance heating. Suitable plasma-jet (electric arc) generators and radio frequency (electromagnetic) plasma generators are described in an article entitled "Trends in High-Temperature Chemical Processing—Part 1," pp. 173–178, Chemical Engineering, Mar. 14, 1966. Present metallurgy places a practical limit of about 1200° C. on the indirect heating of hydrogen in a metal tubular heat exchanger. In an alternative embodiment, hydrogen may first be heated indirectly in a gas-fired furnace to a temperature of, say, 600°–1200° C., and, optionally, all or a portion thereof, either (1) further heated electrically, or (2) mixed with a high temperature stream of electrically-heated hydrogen, and then supplied to the reaction zone or (3) introduced directly to the reaction zone without further heating.

The boron trihalide, where it is recycled material or vaporized from a liquid source, may be heated by indirect heating in metal, such as in a gas-fired furnace, to a temperature of not more than 600° C. and usually less than 500° C. It may be heated to somewhat higher temperatures in a fused silica furnace, e.g. 1000° C. In a process such as illustrated in aforementioned Ser. Nos. 649,-297 and 649,317, the boron trihalide-containing stream from an adjacent boron halogenation zone may be fed directly to the reaction zone at an elevated temperature in the range of 500°–1500° C.

The temperatures of the boron trihalide and hydrogen streams supplied to the reaction zone are selected to provide a dihaloborane product stream which immediately preceding quenching has an equilibrium temperature in the range of 550°–2000° C., more typically 700°–1500° C., and preferably in the range of 700°–1000° C.

An article entitled "Hydrogenation of Boron Trichloride to Dichloroborane," Murib et al., volume 4, No. 4, December 1965, Industrial Engineering Chemistry, discusses the various parameters affecting the reaction of boron trichloride with hydrogen. Higher conversions of boron trichloride to dichloroborane, $BHCl_2$, in accordance with preceding Equation 1, are obtained at higher temperatures and with higher $H_2$:$BCl_3$ ratios. FIG. 1, page 275 of the foregoing article, shows that at the high mol ratio of $H_2$:$BCl_3$ of about 35:1 and a temperature of 700° C., there is a conversion of about 50% of $BCl_3$ to $BHCl_2$. It is readily apparent from this high $H_2$:$BCl_3$ ratio that there will necessarily be a tremendous quantity of recycle hydrogen coursing through the reaction, quenching and separation system. It will be recalled that in the prior art processes high equilibrium temperatures were difficult to attain and hence high $H_2$:$BCl_3$ ratios were necessarily resorted to in order to obtain high conversions.

With the practice of the process of the invention the amount of hydrogen circulating through the system may be drastically reduced, as aptly illustrated in Table I, for comparable conversions with the result that significantly less amounts of heat and refrigeration and much smaller processing equipment are required.

TABLE I

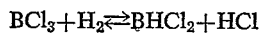

Molar Ratio $H_2:BCl_3=4:1$

| Conversion of $BCl_3$ to $BHCl_2$, percent: | Temperature, °C. (approximate) |
|---|---|
| 20 | 700 |
| 25 | 770 |
| 30 | 850 |
| 40 | 1070 |
| 50 | 1250 |

In the practice of the process of the invention the hydrogen:boron trihalide ratio may be held within the range of 1:1 to 20:1 (preferably in the range of 2:1 to 10:1), and still obtain a good conversion, by employing higher reaction temperatures; preferably in the range of 700° to 1500° C. at time of quenching. Equilibrium temperatures as low as 550° C. may be utilized, but to less advantage, and higher hydrogen:boron trihalide ratios may be employed, but again, to less advantage.

The reactants are contacted for a short period of time, generally less than 15 seconds, and typically from about 0.01 to about 2 seconds. In a preferred embodiment of the instant invention, the hydrogenation reaction is carried on at substantially atmospheric pressure, however, in some applications, the hydrogenation reaction may be conducted at superatmospheric pressures, for example, up to about 30 atmospheres.

It will be seen that high ratios of $H_2:BCl_3$, while leading to a favorable equilibrium conversion for Equation 1, provides excess hydrogen for the progress of Equations 2 and 3, and the further disadvantage of increasing the amount of unreacted hydrogen in the exit stream from the hydrogenation step. In the preferred practice of the applicant's process, the disadvantage of operating Equation 1 at low $H_2:BCl_3$ ratios is offset by operating at higher reaction temperatures which are possible with the process of the invention. Heretofore, it has not been practical in an industrial plant operation to heat a composite stream of boron trichloride and hydrogen much above 750° C. and for this reason the higher conversions obtainable at higher equilibrium temperatures could not be obtained in the practical sense by the methods proposed in the prior art. In the process of the invention, the use of the high temperature hydrogen stream as a source of heat permits heating of the lower temperature boron trihalide in a nearly instantaneous manner to an elevated reaction temperature and thus makes possible the obtaining of higher equilibrium conversions in the dihaloborane-containing product stream exiting from the reaction zone. Rapid mixing of the high temperature hydrogen stream with the lower temperature boron trihalide stream permits the reactants to reach the high equilibrium temperatures in a minimum of time and before the reactions of Equations 2 and 3 to yield elemental boron may significantly progress, immediately following which the dihaloborane-product-containing stream is quenched to minimize loss of boron-hydrogen bonding. Thus, it is seen that in the practice of the process of the invention, the separate heating of at least a portion of the hydrogen to a temperature in excess of 1500° C., the rapid mixing of hot hydrogen with the boron trichloride-containing stream, the short reaction time, followed by precipitious quenching, all contribute to minimize the loss of boron-hydrogen bonding, and lessens appreciably the opportunity for formation of boron. It is contemplated that in most applications of the process of the invention that it will be necessary to electrically heat only a lesser portion of the hydrogen to the elevated temperature (in excess of 1500° C.) to supply the energy needed for the endothermic boron trihalide-hydrogen reaction and to furnish the energy needed to raise the boron trihalide and other hydrogen to the reaction temperature.

With the practice of the process of the invention, it is no longer necessary to heat a combined stream of hydrogen-boron trihalide to elevated temperatures indirectly and thus incur the problems of boron formation and the fouling of the heat transfer surface, nor the problems of heating corrosive boron trichloride to elevated temperatures.

The heating of the high temperature hydrogen employed in the process is preferably accomplished through a plasma generating means, for example, through induction heating by radio frequency (electromagnetic) means, or by an electric arc generator. Temperatures in the range of 2,500° C. to 50,000° C. are readily accomplished through the foregoing plasma heating means. Heating of the hydrogen to a lower temperature up to about 5,000° C. may be achieved through a direct electrical resistance means. Graphite sublimes at around 4,000° C. This places a practical limit on the temperature to which hydrogen may be heated with a carbon resistor means. The use of a resistance heater based on tungsten permits heating of the hydrogen to a somewhat higher temperature but nowhere approaching that possible with a plasma generating means. Generally speaking, heating of hydrogen by direct electrical resistance means will not be practical above 3,000 to 3,500° C.

It should be appreciated that the plasma heating technique may be employed for heating only a minor portion of the hydrogen supplied, with the major portion of the hydrogen being heated indirectly through a metal tubular heat exchanger. The indirect heated hydrogen may be introduced directly to the reaction zone or alternatively added to the plasma heated hydrogen and then supplied to the dihaloborane reaction zone. In most instances the combined hydrogen will have a temperature in excess of 1500° C. in order to assure the high equilibrium temperature, preceding quenching, generally desired in the process of the invention. However, there may be instances, for example, where the boron trihalide stream has a relatively high temperature, as where it is supplied from a boron halogenation zone, that the total hydrogen supplied to the reaction zone will have a temperature less than 1500° C.

It has been the conventional practice to heat the combined stream of hydrogen and boron trihalide through the wall of a heat exchanger with the inevitable consequence that the gas film next to the heat transfer surface is hotter than the bulk temperature of the gaseous stream. This elevated temperature of the gas film adjacent the heat transfer surface promotes a side reaction to produce elemental boron which deposits out on the heat exchanger wall. In the process of the invention the higher temperature hydrogen streams provide the heat needed and instantaneously elevates the temperature of the boron trihalide (thus, avoiding the relatively slow indirect heating occurring with the use of a heat exchanger) and thusly promoting the endothermic reaction of the hydrogen and boron trihalide with minimum formation of elemental boron solids.

Although exemplary embodiments of the invention have been disclosed herein for purposes of illustration, it will be understood that various changes, modifications, and substitutions may be incorporated in such embodiments without departing from the spirit of the invention as defined by the claims which follow.

I claim:

1. In a process for the production of a dihaloborane-containing stream by reacting high temperature hydrogen and lower temperature boron trihalide in a reaction zone to produce a dihaloborane-containing stream, the improvement comprising:

supplying the hydrogen to the reaction zone at a temperature in excess of 1500° C. with said high temperature hydrogen and said lower temperature boron trihalide containing sufficient energy to promote the endothermic reaction of the hydrogen and boron trihalide and to maintain said endothermic reaction at an equilibrium temperature of at least 550° C. without the external provision of heat to the reaction zone through the boundaries thereof, said energy for the endothermic reaction being supplied solely by the gases provided to the reaction zone, and with hydrogen being present in the reaction zone in one to twenty moles per mole of boron trihalide and with the hydrogen and boron trihalide reactants being in contact at the equilibrium temperature of the reaction zone for a period of time less than about 15 seconds, and rapidly quenching the dihaloborane-containing stream to minimize loss of boron-hydrogen bonding.

2. In a process for the production of a dihaloborane-containing stream by reacting high temperature hydrogen and lower temperature boron trihalide in a reaction zone to produce a dihaloborane-containing stream, the improvement comprising:

supplying the hydrogen to the reaction zone at a temperature in excess of 1500° C. with said high temperature hydrogen and said lower temperature boron trihalide containing sufficient energy to promote the endothermic reaction of the hydrogen and boron trihalide and to maintain said endothermic reaction at an equilibrium temperature of at least 550° C. without the external provision of heat to the reaction zone through the boundaries thereof, said energy for the endothermic reaction being supplied solely by the gases provided to the reaction zone, and with hydrogen being present in the reaction zone in one to twenty moles per mole of boron trihalide and with the hydrogen and boron trihalide reactants being in contact at the equilibrium temperature of the reaction zone for a period of time within the range of 0.01 second to 5 seconds, and rapidly quenching the dihaloborane-containing stream to minimize loss of boron-hydrogen bonding.

3. A process in accordance with claim 2 wherein the dihaloborane-containing product stream preceding the quenching has an equilibrium temperature in the range of 550° C. to 2000° C.

4. A process in accordance with claim 2 wherein the dihaloborane-containing product stream preceding the quenching has an equilibrium temperature in the range of 700° C. to 1500° C.

5. A process in accordance with claim 2 wherein the hydrogen and boron trihalide are present in the reaction zone in a hydrogen-boron trihalide mole ratio in the range of 2:1 to 10:1.

6. A process in accordance with claim 2 wherein the dihaloborane-containing stream is quenched to a temperature of less than 300° C.

7. A process in accordance with claim 2 wherein the boron trihalide is boron trichloride.

8. A process in accordance with claim 2 wherein at least part of the hydrogen is heated electrically before introduction into the reaction zone.

9. A process in accordance with claim 8 wherein the heating is achieved with an electric arc means.

10. A process in accordance with claim 8 wherein the heating is achieved by a radio frequency, electromagnetic means.

11. A process in accordance with claim 8 wherein the heating is achieved by direct electrical resistance means.

12. A process in accordance with claim 2 wherein the hydrogen comprises plasma heated hydrogen having a temperature of 2500° C. to 50,000° C. mixed with a lower temperature hydrogen with the mixed hydrogen having a temperature in excess of 1500° C.

13. A process in accordance with claim 12 wherein the lower temperature hydrogen is heated through indirect heating means to a temperature in the range of 600° C. to 1200° C.

14. A process in accordance with claim 2 wherein the hydrogen comprises a plasma heated hydrogen having a temperature of 2500° C. to 50,000° C. and a larger second amount of a lower temperature hydrogen which is separately supplied to the reaction zone with the combined energy of the two amounts of hydrogen being in excess of 1500° C.

15. A process in accordance with claim 14 wherein the lower temperature hydrogen is heated through indirect heating means to a temperature in the range of 600° C. to 1200° C.

16. A process in accordance with claim 2 wherein the boron trihalide stream provided to the reaction is previously heated to a temperature of not more than 1000° C. in a fused silica furnace.

17. A process in accordance with claim 16 wherein the boron trihalide stream is provided to the reaction at a temperature of not more than 600° C.

18. A process in accordance with claim 2 wherein the boron trihalide-containing stream is from an adjacent boron halogenation zone.

19. A process in accordance with claim 2 wherein the hydrogen and boron trihalide reactants are in contact for a period of 0.1 to about 2 seconds.

References Cited

UNITED STATES PATENTS

| | | | |
|---|---|---|---|
| 2,768,061 | 10/1956 | Cook et al. | 23—361 X |
| 3,264,072 | 8/1966 | Bergantz et al. | 23—361 |
| 3,323,867 | 6/1967 | Pearson | 23—361 X |
| 3,328,135 | 6/1967 | Hunt et al. | 23—361 |
| 3,473,899 | 10/1969 | Cooper | 23—361 |

OTHER REFERENCES

Marynowski et al.: "Industrial & Engineering Chemistry," vol. 1, No. 1, February 1962.

OSCAR R. VERTIZ, Primary Examiner

G. O. PETERS, Assistant Examiner

U.S. Cl. X.R.

423—472